United States Patent
Soni et al.

(10) Patent No.: US 11,188,436 B2
(45) Date of Patent: Nov. 30, 2021

(54) MONITORING AN ARTIFICIAL INTELLIGENCE (AI) BASED PROCESS

(71) Applicant: ACCENTURE GLOBAL SOLUTIONS LIMITED, Dublin (IE)

(72) Inventors: Soujanya Soni, Bangalore (IN); Kavita V V Ganeshan, Mumbai (IN); Aishwarya Kaliki, Bangalore (IN); Madhura Shivaram, Bangalore (IN); Mandar Mohan Patil, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 436 days.

(21) Appl. No.: 16/254,314

(22) Filed: Jan. 22, 2019

(65) Prior Publication Data

US 2020/0133816 A1 Apr. 30, 2020

(30) Foreign Application Priority Data

Oct. 30, 2018 (IN) .............................. 201811041021

(51) Int. Cl.
| | |
|---|---|
| *G06F 11/34* | (2006.01) |
| *G06F 11/30* | (2006.01) |
| *G06F 8/41* | (2018.01) |
| *G06F 11/32* | (2006.01) |
| *G06N 5/02* | (2006.01) |
| *G06F 40/30* | (2020.01) |

(52) U.S. Cl.
CPC .......... *G06F 11/3409* (2013.01); *G06F 8/427* (2013.01); *G06F 11/3051* (2013.01); *G06F 11/3086* (2013.01); *G06F 11/328* (2013.01); *G06F 11/3447* (2013.01); *G06F 11/3466* (2013.01); *G06F 40/30* (2020.01); *G06N 5/022* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 9,141,097 B2 | 9/2015 | Tsai et al. | |
| 9,460,408 B2 | 10/2016 | Berlandier et al. | |
| 2004/0056908 A1* | 3/2004 | Bjornson | .................. G06F 8/34 717/115 |
| 2005/0289506 A1* | 12/2005 | Renner | ..................... G06F 8/34 717/105 |
| 2007/0005297 A1* | 1/2007 | Beresniewicz | .... G05B 23/0235 702/181 |
| 2007/0027985 A1* | 2/2007 | Ramany | ................ H04L 67/125 709/224 |

(Continued)

*Primary Examiner* — Qing Chen
(74) *Attorney, Agent, or Firm* — Mannava & Kang, P.C.

(57) ABSTRACT

An Artificial Intelligence (AI)-based automated process is monitored via a process monitoring system that identifies components used in the execution of the sub-processes of the automated process. Various metrics are selected for collection prior to or during the execution of the AI-based automated process. The values of the metrics are collected as step outputs corresponding to the sub-processes. A final output generated upon the execution of the automated process is also collected. The step outputs can be used to determine the reason why the automated process produced a certain final output.

20 Claims, 8 Drawing Sheets

(56) References Cited

U.S. PATENT DOCUMENTS

| | | | |
|---|---|---|---|
| 2011/0093418 A1* | 4/2011 | Kwok | G06N 3/008 |
| | | | 706/12 |
| 2012/0016701 A1* | 1/2012 | Narendra | G06Q 10/063 |
| | | | 705/7.11 |
| 2014/0100846 A1* | 4/2014 | Haine | G06F 40/186 |
| | | | 704/9 |
| 2017/0213156 A1* | 7/2017 | Hammond | G06F 9/451 |
| 2018/0018740 A1 | 1/2018 | Unsal et al. | |
| 2018/0357543 A1* | 12/2018 | Brown | G06F 16/9024 |
| 2020/0104911 A1* | 4/2020 | Suvajac | G06N 7/005 |
| 2020/0125722 A1* | 4/2020 | Iyer | G06F 9/4843 |

* cited by examiner

MONITORING AN ARTIFICIAL INTELLIGENCE (AI) BASED PROCESS

PRIORITY

The present application claims priority under 35 U.S.C. 119(a)-(d) to the Indian Non-Provisional Patent Application Serial No. 201811041021, having a filing date of Oct. 30, 2018, the disclosure of which is hereby incorporated by reference in its entirety.

BACKGROUND

Automation and Artificial Intelligence (AI) are transforming the various aspects of human society spurring economic growth by increasing productivity. Beyond traditional automation and advanced robots, newer and more autonomous systems are appearing in environments ranging from self-driving vehicles to automated checkouts. Another example includes robotic process automation (RPA) which is an emerging form of clerical process automation technology based on software robots or AI workers. These technologies are also transforming the nature of work and the workplace so that machines are increasingly assigned to execute tasks that are actually done by human workers. In fact, the machines can go beyond human capabilities in terms of speed and accuracy when executing certain routine tasks. This progress has been driven to a large extent by improvements in computing systems and components including the mechanics, sensors and software. AI especially made rapid progress recently owing to the increasing sophistication of machine learning (ML) algorithms which are in turn a result of increases in computing power and the exponential growth in data available to train the algorithm.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
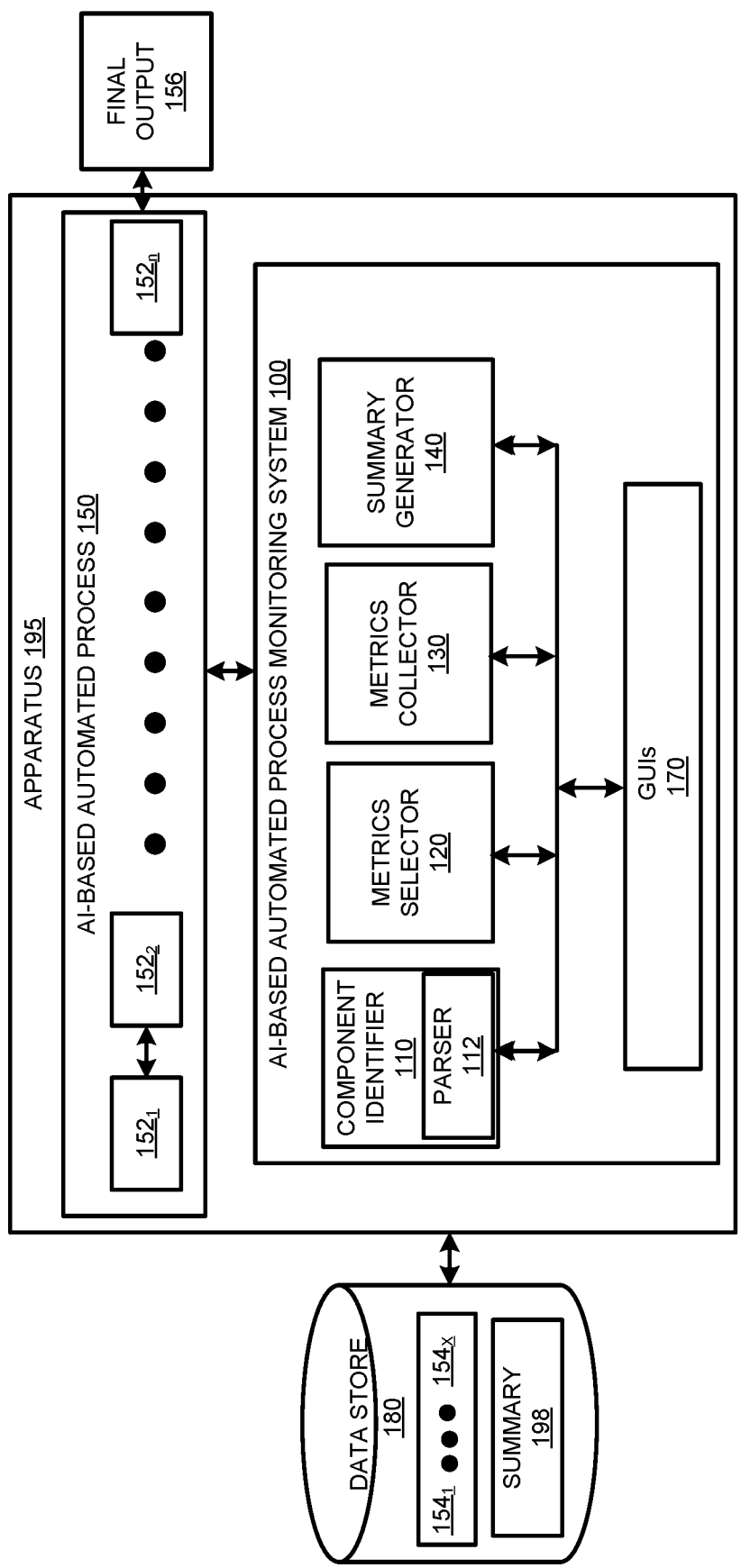
FIG. 1 is a block diagram that shows an AI-based automated process monitoring system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based automated process monitoring system accesses code of an AI-based automated process, collects the various metrics associated with automation components employed by the AI-based automated process, provides the introspection output which can include step outputs for the various sub-processes that are executed as part of the automated process. The step outputs enable an understanding or provide a justification to the final output of the automated process. The AI-based automated process can include any process which employs AI or machine learning (ML) elements to process a received input and produce the final output. The automated process can include a series of sub-processes wherein the output of one of the sub-processes is fed as input to a next sub-process. The sub-processes can be executed by various AI/ML based process components such as the data models, algorithms, code libraries and other platforms that enable executing the automated functions of AI-based systems.

In an example, the process monitoring system can be provided as a library included within the code of the automated process. In an example, the process monitoring system can be provided as a downloadable resource. The user has the option of including the process monitoring system within the code of the automated process and employing the functionality as needed with the automated process. The process monitoring system is configured to identify the various AI-based process components used for the execution of the automated process. The code of the automated process can be parsed to identify the various process components.

Based at least upon identification of the process components, the process monitoring system selects the metrics to be collected. The metrics to be collected can include the various attributes of the process components employed by the sub-processes. The metrics can also include the outputs produced by the sub-processes in some examples. Depending on the nature of the metrics e.g., the metrics being attributes or outputs, the metrics can be collected prior to or during the execution of the sub-processes. In an example, particular wrapper application programming interfaces (APIs) can be created on the process components for collecting the metrics. In the case of custom metrics, the instructions to output the values of those metrics can be included within the code of the automation process. Custom metrics are differentiated in that the model identified for ML e.g., Naïve Bayes, the model tuning parameters etc. can be considered as standard ML metrics. Examples of custom metrics will be described further infra at the appropriate sections.

The various metrics can be collected as step outputs corresponding to the particular sub-process steps. The final output that is generated upon the execution of the automated process can be explained or justified based on the step outputs collected during the execution of the sub-processes. A summary corresponding to the introspection output and including one or more of the step outputs and the final output can be generated via employing a natural language generator (NLG) to process the step outputs and/or the final output(s). An output graphical user interface (GUI) such as a browser can be employed to provide the summary. In an example, the raw data produced by the automated process and which has not be processed by the NLG can also be inspected.

The process monitoring system as disclosed herein provides a general purpose lightweight, plug-in and play system that can collect pre-defined insight metrics from a primary analytics flow corresponding to the automated process. The process components employed for various functions including information extraction (IE), machine learning modeler, rule engine, analytics etc. can be automatically identified. The process monitoring system as disclosed herein provides accumulated insights from the introspection layer shared along with the result from a primary flow which is plugged into NLG to automatically explain the final output(s) of the automated process.

The rapid progress made by AI-based systems has resulted in increased complexities of AI-based pipelines wherein data is exchanged between multiple process components. Each of the process components performs an assigned complex task and passes on the step output or updated data to a next process component. The final output is obtained upon the process components completing their assigned tasks. Outputs from such complex AI processes can sometimes be black boxes not only for the users but also for the technical personnel who build and maintain the AI systems. This is especially true in deep learning tools such as neural networks that are used to identify patterns in data whose structures generally mimic the human brain. While such systems can produce output with great speed and accuracy, it is not always clear how the complex computations reach a particular state or produce a final output.

Verifying the accuracy of the final output via tracking the progress of data through the various process components can be a very complex task. Generally, verification of the results involved manually executing each process component separately and manually calculating various metrics and verifying the results. Such a process can be messy and time consuming. The process monitoring system disclosed herein therefore enables a technical improvement in the field of AI-based automated processes by engineering the processes to produce predefined metrics thereby providing greater transparency to the AI-based automated processes. Therefore, a greater understanding of the automated process is achieved wherein the final output can be comprehended via tracking the step outputs produced during the execution of the automated process. This enables the users to more easily track the errors within the AI-based automated process thereby increasing the accuracy of results produced by the AI-based automated processes.

FIG. 1 is a block diagram that shows an AI-based automated process monitoring system 100 in accordance with examples disclosed herein. An AI-based automated process 150 is being executed by an apparatus 195 that also executes the process monitoring system 100. The apparatus 195 can include a processor and a processor-readable data store 180 as detailed further herein for the execution of the automated process 150 and the process monitoring system 100. Examples of automated processes can include processes from a variety of domains such as but not limited to, automatic processing of health claims, automatic processing of mortgage loan applications, conversion of verbose textual data into processor-executable rules and the like. The automated process 150 can include complex pipeline of various sub-processes $152_1 \ldots 152_n$ where data flows from one component to another component. Each of the sub-processes $152_1 \ldots 152_n$ can perform a corresponding analytics function(s) and passes on the output to another component. The final output 156 is obtained at the end of the pipeline. Referring to the example of automating health claim processing, the sub-processes $152_1 \ldots 152_n$ can include data curation, prioritization, rule engine, NLP and benefits calculation. Further process details and the monitoring of the process by the process monitoring system 100 will be discussed further infra.

The process monitoring system 100 enables obtaining certain predetermined metrics from each of the sub-processes $152_1 \ldots 152_n$ (where n is a natural number and n=1, 2, 3 . . . ) thereby enabling verification of the final output 156. The verification enables determining how the final output 156 was generated. The process monitoring system 100 therefore identifies each of the sub-processes $152_1 \ldots 152_n$, obtains the corresponding predetermined metrics from $154_1 \ldots 154_x$ (where x is a natural number and x=1, 2, 3 . . . ) from each of the sub-processes $152_1 \ldots 152_n$ thereby generating insights that afford greater transparency to the automated process 150. The metrics $154_1 \ldots 154_x$ can include one or more of the attributes and the outputs of the sub-processes $152_1 \ldots 152_n$. In some examples, custom metrics can be defined within the metrics selector 120 for one or more of the sub-processes $152_1 \ldots 152_n$.

The process monitoring system 100 can be provided as a downloadable library including processor-readable instructions that can be executed in parallel with the automated process 150. In an example, the process monitoring system 100 includes can be pre-configured for the automated process 150. The process monitoring system 100 can include a component identifier 110, a metrics selector 120, metrics collector 130, and a summary generator 140. The component identifier 110 identifies the various sub-processes $152_1 \ldots 152_n$, that form the automated process 150. The component identifier 110 can include a parser 112 that can parse the code of the automated process 150 to identify the sequence of the sub-processes that make up the automated process 150. Respective component identification tools such as wrapper APIs can be further employed to identify the various process components such as the APIs and other tools that are employed in the sub-processes $152_1 \ldots 152_n$. The API type can identify from the import statements, the libraries being used for the executed of the automated process 150. Correspondingly, the process components that are being employed from the libraries can also be identified.

When a sub-process of the plurality of sub-processes $152_1 \ldots 152_n$ is identified, the metrics corresponding to the sub-process are selected by the metrics selector 120. As mentioned earlier, the metrics selector 120 can be configured to select a subset of the metrics $154_1 \ldots 154_n$ that correspond to the sub-process. Referring to the example of the automatic conversion of the information in a verbose text document into processor-based instructions, the sub-processes $152_1 \ldots 152_n$, can include i) structural analysis of the verbose text document, ii) semantic analysis of the text or information in the verbose text document, iii) retrieval of logic and domain-specific knowledge, iv) processing of the retrieved textual information, logic and domain-specific knowledge by a rule engine and iv) generation of platform specific code for the derived rules. Each of the sub-processes outlined here can have a corresponding, predetermined set of metrics that are to be retrieved.

Prior to the commencement of one of the sub-processes $152_1 \ldots 152_n$, or as the sub-process is being executed, the metrics collector 130 begins collecting the values of a set of metrics that were selected by the metrics selector 120 for the sub-process. Various metrics can be collected based on the type of the automated process being monitored. An AI-based automated process which involves data analysis such as automatic processing of health claim can require certain metrics, while a process involved in data conversion such as text to rules conversion as discussed herein can require different types of metrics. Generally, the metrics collected for a process can depend on the industry practice corresponding to the process.

In an example, the metrics collector 130 can access the wrapper APIs configured for the tools used in the sub-process such as one or more of SCIKIT or NLTK (natural language toolkit). In the case of custom metrics, the metrics collector 130 can be configured explicitly via programming instructions including access functions to collect the custom metrics as part of the output from the sub-process. In an example, the metrics collector 130 can parse the code of the automated process 150. In certain automatic processes such as those on Java-based systems, the rules that were fired for a particular decision can be identified and collected. Similarly the user interface (UI) for the Java based system can be obtained. The collection of metrics of a particular sub-process enables human users to understand why the sub-process produced a particular output.

The results from the metrics collector 130 are provided to a summary generator 140 which includes a natural language generator (NLG) for creating a natural language summary 198 based on grammatical and syntactic rules. The summary 198 can be displayed on one of the GUIs 170 that display output from the process monitoring system 100. In an example, the summary generator 140 can employ prebuilt templates for generating the summary. In an example, the raw output from the metrics collector 130 can be directly displayed without processing by the summary generator 140. Such output can be examined by technical personnel such as programmers to identify particular steps in the code that generated a particular output.

By the way of illustration and not limitation, various actions and justifications for the actions are discussed below. If the AI-based automated process 150 relates to a health claim advisor which determines whether or not to pay the claims, one of the actions can involve denying the claim. An action justification can include text matching with "Deny as investigational". A claim can be pended based on an action justification that the test matches "request for medical records". Another claim can be paid based on an action justification "because Drools followed rule 1, 13 and 15. The AI-based automated process 150 is configured to produce the recommended action. However, the process monitoring system 100 also produces the action justification thereby providing a reasoned output for user review.

In an example, the summary 198 can also include suggestions based on prior runs of similar processes. For example, if a user sets a learning rate for an ML component that is far away from the range generally associated with the component, a comparison of the learning rate with a predetermined threshold can be used to generate alerts for the learning rates in the summary 198. Similarly inexperienced ML practitioners may be unfamiliar the percentage of data to be divided between test and training data. The summary 198 can provide suggestions regarding the ratio of the training and test data to be used where appropriate.

Figure 2:
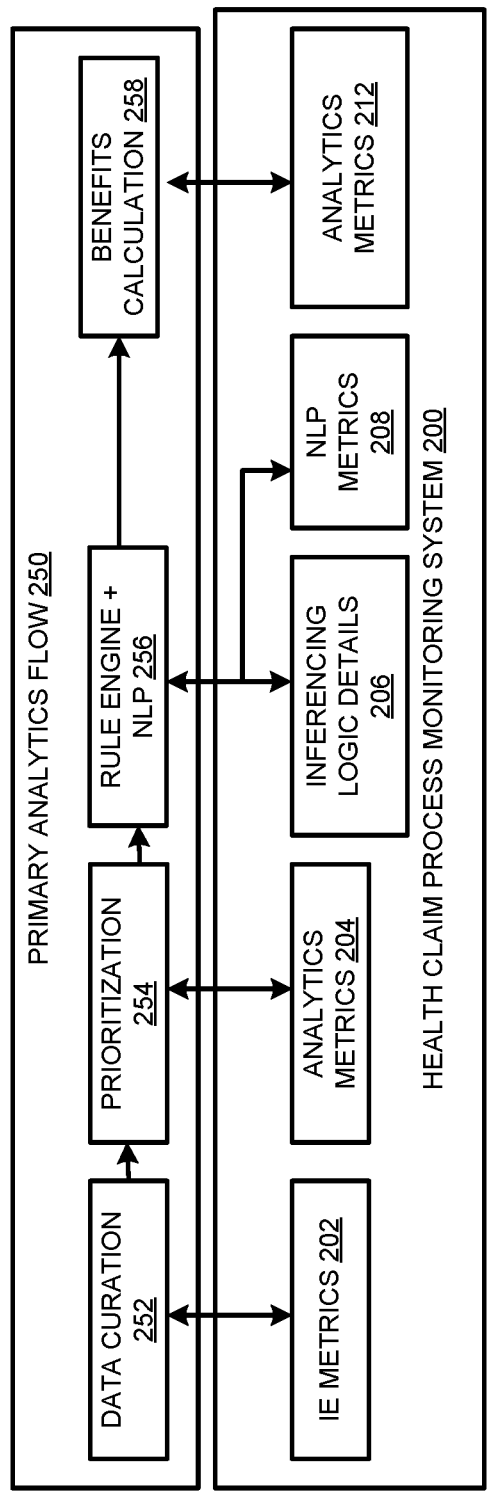
FIG. 2 shows an AI-based automated process and the corresponding AI-based monitoring system in accordance with the examples disclosed herein.

FIG. 2 shows an AI-based automated process or a primary analytics flow 250 and the corresponding AI-based monitoring system or an introspection layer 200 in accordance with the examples disclosed herein. The primary analytics flow 250 pertains to a health claim adjudication process flow. The sub-processes within the primary analytics flow 250 include data curation 252, prioritization 254, rule engine+NLP 256 and benefits calculation 258. The data curation 252 typically can occur during preprocessing and input validation so that the input gets curated with implementation of noise removal and other pre-processing techniques. The output from the data curation 252 is provided as input to the prioritization 254 where the data to be processed by the various rules is identified. The data thus identified is fed to the corresponding rules for processing at the rule engine 256 which can form the backbone of the automated process 150. Some of the rules can be pattern based or textual processing based rules. As a result NLP and ML elements are also employed during with the rule engine at 256. In an adjudication process, the final adjudication can involve some benefit calculation 258. The primary analytics flow 250 can form the core functionality of an automated process and the sub-processes 252 . . . 258 are fairly complex processes.

The introspection layer 200 corresponds to the process monitoring system 100 that enables obtaining the metrics from each of the sub-processes 252 . . . 258. During the data preprocessing that occurs at the data curation 252, information extraction (IE) metrics 202 are collected. In the prioritization 254, analytics are executed over a data set. Accordingly, analytics metrics 204 are collected during the prioritization 254. When the output from the prioritization 254 is processed by the rule engine 256, inferencing logic specific metrics 206 are captured. Also, when NLP/ML are used for the rule engine processing the corresponding the NLP/ML model specific metrics 208 are collected. The benefits calculation 258 can enable collection of analytics metrics 212.

Figure 3:
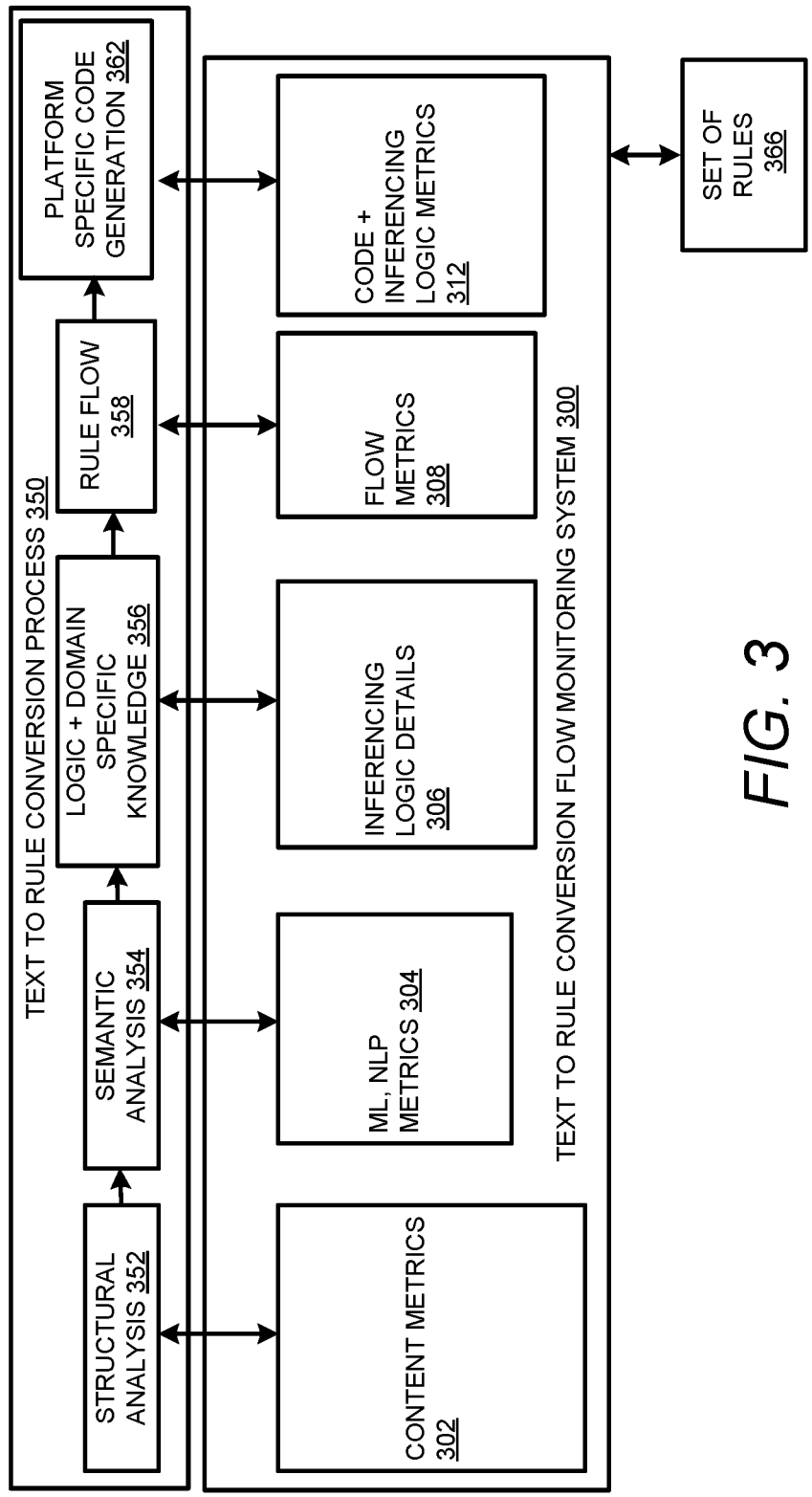
FIG. 3 shows a block diagram of an AI-based automated process and the corresponding metrics collected in accordance with the examples disclosed herein.

FIG. 3 shows a block diagram of an AI-based automated process 350 and the corresponding metrics collected in accordance with the examples disclosed herein. The various metrics that are collected for the sub-processes of converting textual data in a textual manual to processor-consumable rules are outlined herein for illustration purposes. It can be appreciated that when the process monitoring system 100 can be integrated with other AI-based processes, the process monitoring system 100 is similarly configured to monitor other process-specific metrics. The text to rule conversion process 350 includes the sub-processes of structural analysis 352, semantic analysis 354, retrieval of logic and domain specific knowledge 356, rule flow 358 and platform-specific code generation 362. Various metrics as outlined below are collected by the text to rule conversion flow monitoring system 300.

The conversion flow monitoring system 300 enables collecting content metrics 302 including data format, conversion metrics, encoding metrics and document segmentation metrics for the structural analysis sub-process 352. The semantic analysis process 354 employs trained ML/NLP models on the output of the structural analysis process 352. The NLP/ML metrics 304 collected for the semantic analysis sub-process 354 can include ML pre-processing metrics, data split, ML data structures e.g., tracking size and shape of the matrices after transformations, ML class distributions, ML/DL model parameters/hyper-parameters, learning rate, algorithm etc., NLP preprocessing (tokenization, lemmatization, tagging, chunking distribution), NLP custom model features, data distribution, NLP—custom model features, data distribution, supporting language model (porter stemmer, wordnet, etc.), NLP-parse/dependency tree, NLP-information extraction (IE) co-reference, algorithm used and NLP-features extraction. The collection of metrics 304 from the semantic analysis sub-process 354 helps users determine why the semantic analysis process 354 produced a particular output. For example, if it is known that a certain sub-process executed NLP based processing, the metrics 304 collected for the semantic analysis sub-process 354 can provide information such as the kind of tokenization, the kind of tagger used, the language models that were used etc. which enables clarification on why a particular output was generated by the semantic analysis sub-process 354.

The output of the semantic analysis sub-process 354 is employed for logic and domain specific knowledge 356 wherein the NLP/ML output from the semantic analysis sub-process 354 is converted to rules with the retrieved domain knowledge. The domain knowledge is super imposed on the aspects of the language details (input from the semantic analysis sub-process 354) to construct logic that is specific to the domain. Accordingly, inferencing logic detail metrics 306 collected for the logic and domain-specific knowledge retrieval sub-process 356 can include natural language to logic conversion accuracy and domain interface metrics.

When the logic and the domain knowledge from the textual manuals is understood, a rule flow 358 is built. For example, a rule can specify the action that is to be executed with a claim type is ending with digit '7'. Another kind of rules can specify if-else type of actions. The information from the textual manual is thus converted into a set of rules 366 which forms the final output of the text to rule conversion process 350. Thus the flow metrics 308 collected for the rule flow sub-process 358 can include logic to process flow conversion accuracy and interface with platform metrics. Therefore, the flow metrics 308 capture the outputs from the decision making sub-process thereby providing transparency to the final output/set of rules 366 produced by the text to rule conversion flow 350. For example, when the text to rule conversion flow 350 relates to a health claim adjudication process, the reasons or cause for the claim to be rejected, pending or paid can be determined from the flow metrics 308.

The output from the building of the rule flow 358 is provided to the platform specific code generation sub-process 362 for converting the rules into code e.g., Python or Java code. The code and inferencing logic metrics 312 that are collected for the platform specific code generation sub-process 362 include logic to code conversion metrics, flow to code metrics and platform interface metrics. The code and inferencing logic metrics 312 thus collected can provide information regarding which of the rules were accurately converted to code and which of the rule flows were not accurately converted into code.

Figure 4:
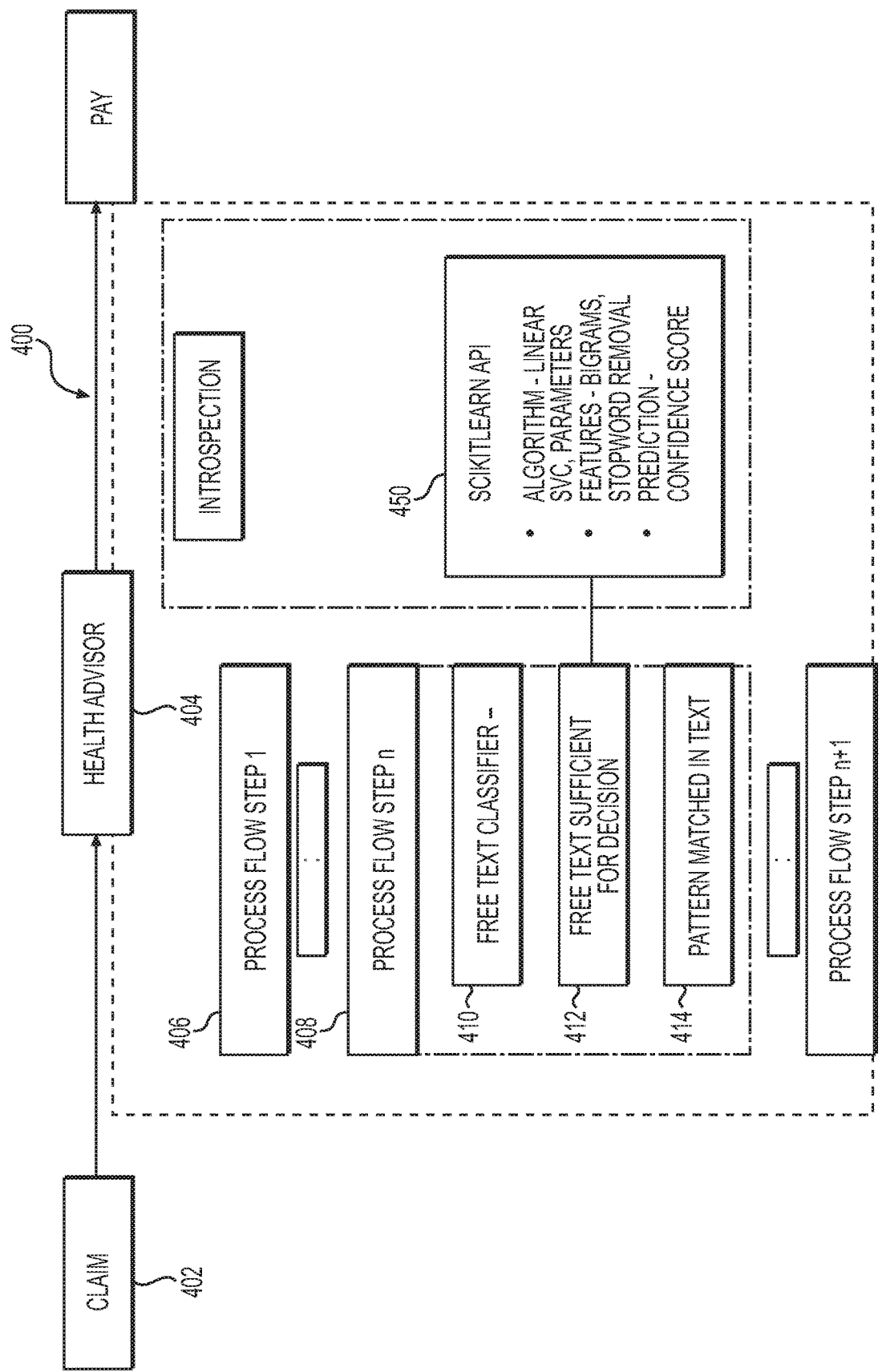
FIG. 4 shows a block diagram that details the process of collecting the metrics in accordance with the examples disclosed herein.

FIG. 4 shows a block diagram 400 that details the process of collecting the metrics in accordance with the examples disclosed herein. A claim 402 is being processed by an AI-based automated process such as the health advisor process 404 which receives the claim 402 as the input and provides a detectable output regarding paying, pending or denying the claim. The health advisor 404 includes rules and inferencing logic within each of the process flow steps 1 406 to step n 408 in arriving at the output on whether or not the claim 402 should be paid, denied or put on hold etc. In the process depicted in the block diagram 400, textual data is being processed using the inferencing logic at the step 406 in arriving at the output. Scikitlearn APIs are the process components that are employed for processing the textual data in the step 406. Accordingly the various the Scikitlearn library specific parameters or metrics 450 are captured as shown. Certain custom metrics such as but not limited to, number of rules fired, number of exceptions received on the rules fired where the exceptions can be defined by a health domain expert, number of keyword patterns to be matched on any textual data where keyword list can include custom dictionary or knowledge base includes complex logic can be defined for the health advisor process 404.

At 410, a free text classifier is employed to process the textual data from the claim 402 received at the input. The metrics 450 that are captured at the step 410 can include the algorithm being used, which in this example, includes Linear Support Vector Classification (SVC), parameters etc., The process flow step n 408 further determines at 412 if sufficient free text is available from the inputted claim 402 to produce a decisive output. The features being used in the textual processing such as bigrams, stopword removal etc. are captured at the step 412. By the way of illustration and not limitation, a pattern matching rule can be employed at 414 for making the determination whether or not to pay so that if the pattern is found in the text the claim is paid, else the claim is rejected or pended. Accordingly, the confidence score associated with the prediction is one of the metrics captured at the step 414. In an example, a decision classifier can be employed to make the decision. The process monitoring system 100 can output information regarding the model, the keyword matches, regex or domino rules and supporting relevant tool information. The Scikitlearn API parameters 450 that are thus captured as step outputs for each of the steps 410, 412, and 414 are displayed as output upon being processed by the summary generator 140 in accordance with the examples outlined below.

Figure 5:
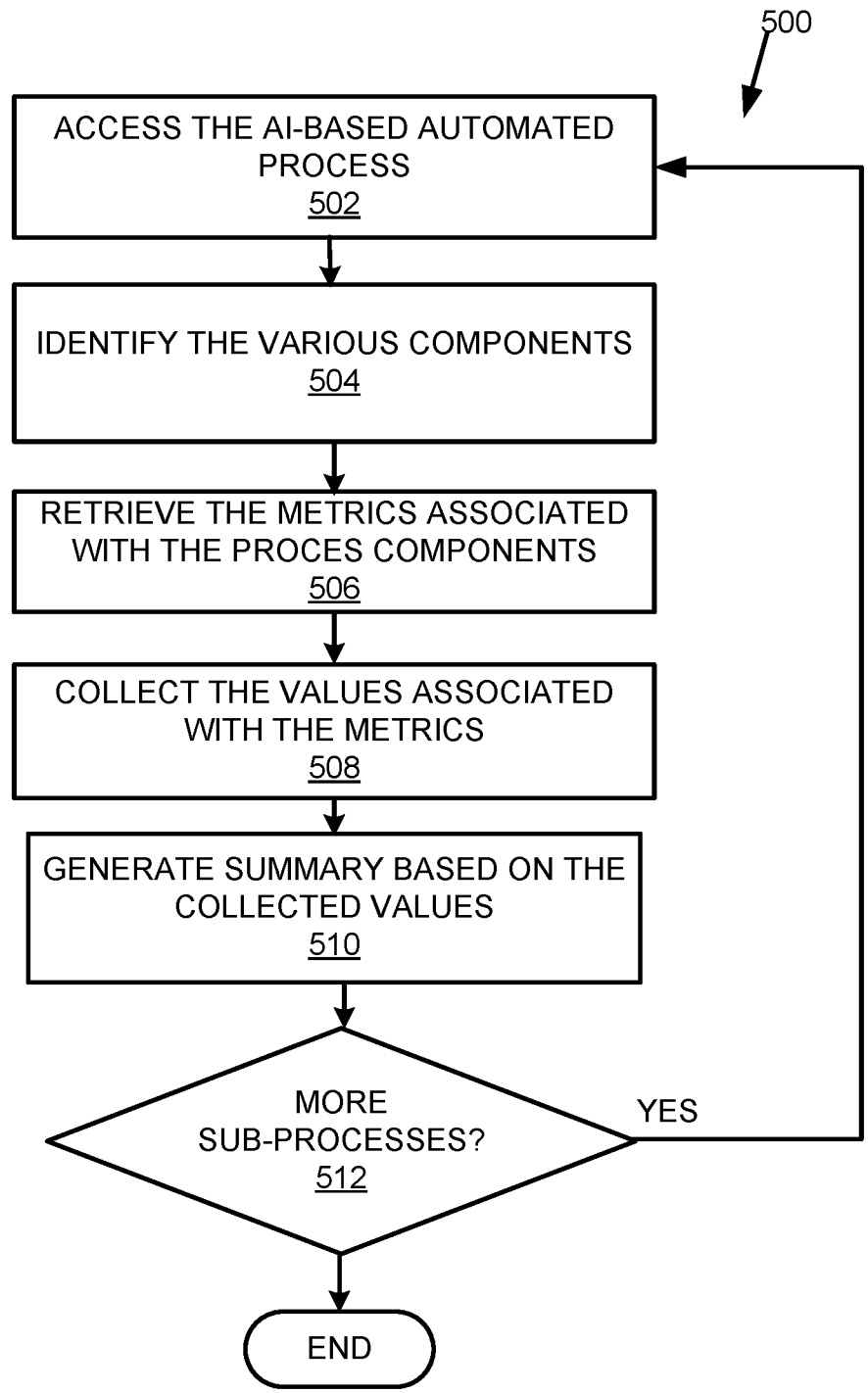
FIG. 5 shows a flowchart that details a method of monitoring the AI-based automated process in accordance with the examples disclosed herein.

FIG. 5 shows a flowchart 500 that details a method of monitoring the AI-based automated process 150 in accordance with the examples disclosed herein. The method begins at 502 wherein code of a sub-process of the AI-based automated process is about to be executed or has commenced executing is accessed. In an example, the process monitoring system 100 can be in the form of downloadable library of processor-executable instructions. In an example, the process monitoring system 100 can be included with the apparatus 195 executing the AI-based automated process 150. At 504, the monitoring system 100 identifies the various components pertaining to the sub-processes $152_1 \ldots 152_n$. As mentioned above, the code enabling execution of the AI based automated process 150 can be parsed in order to identify the various process components. The metrics associated with the identified process components are retrieved at 506. The process monitoring system 100 can have predetermined metrics associated with the various process components that are to be monitored during the execution of the AI based automated process 150. Therefore, such metrics that are to be collected prior to or during the execution of the AI based automated process 150 are retrieved. At 508 the values associated with the retrieved metrics are collected at the appropriate times. In an example, the rule events that are fired within a sub-process can be monitored and the values can be collected from the rule events.

A summary which can include the collected values or recommendations based on the collected values is generated at 510. In an example, the summary can be generated from a template. It is determined at 512 if further sub-processes exist for analysis and/or introspection. If at 512, it is determined that further sub-processes exist, then the method returns to 502 to select the next sub-process. If at 512, it is determined that no further sub-processes exist, the method terminates on the end block.

Figure 6:
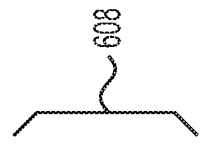
FIG. 6 shows processor readable instructions for collecting metrics in accordance with the examples disclosed herein.

FIG. 6 shows processor readable instructions for collecting metrics in accordance with the examples disclosed herein. The process monitoring system 100 is initially imported or downloaded at 602. The process components used are obtained at 604 which include Scikitlearn and Keras. Metrics such as the model 'linearSVC' which is used for the automated process is collected as shown at 606. The template 608 is used for outputting the summary generated from the metrics.

Figure 7:
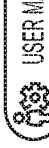
FIG. 7 shows a user interface (UI) that displays information generated by the process monitoring system in accordance with the examples disclosed herein.

FIG. 7 shows a UI 700 that displays information generated by the process monitoring system 100 in accordance with the examples disclosed herein. More particularly, the process monitoring system 100 in this example is incorporated into an AI-based automated process associated with healthcare claim settlements executed by a health claim advisor application. The health claim advisor receives claim information from subscribers of healthcare plans and determines an outcome related to settling the claims which can include paying, pending or denying the claims.

Figure 8:
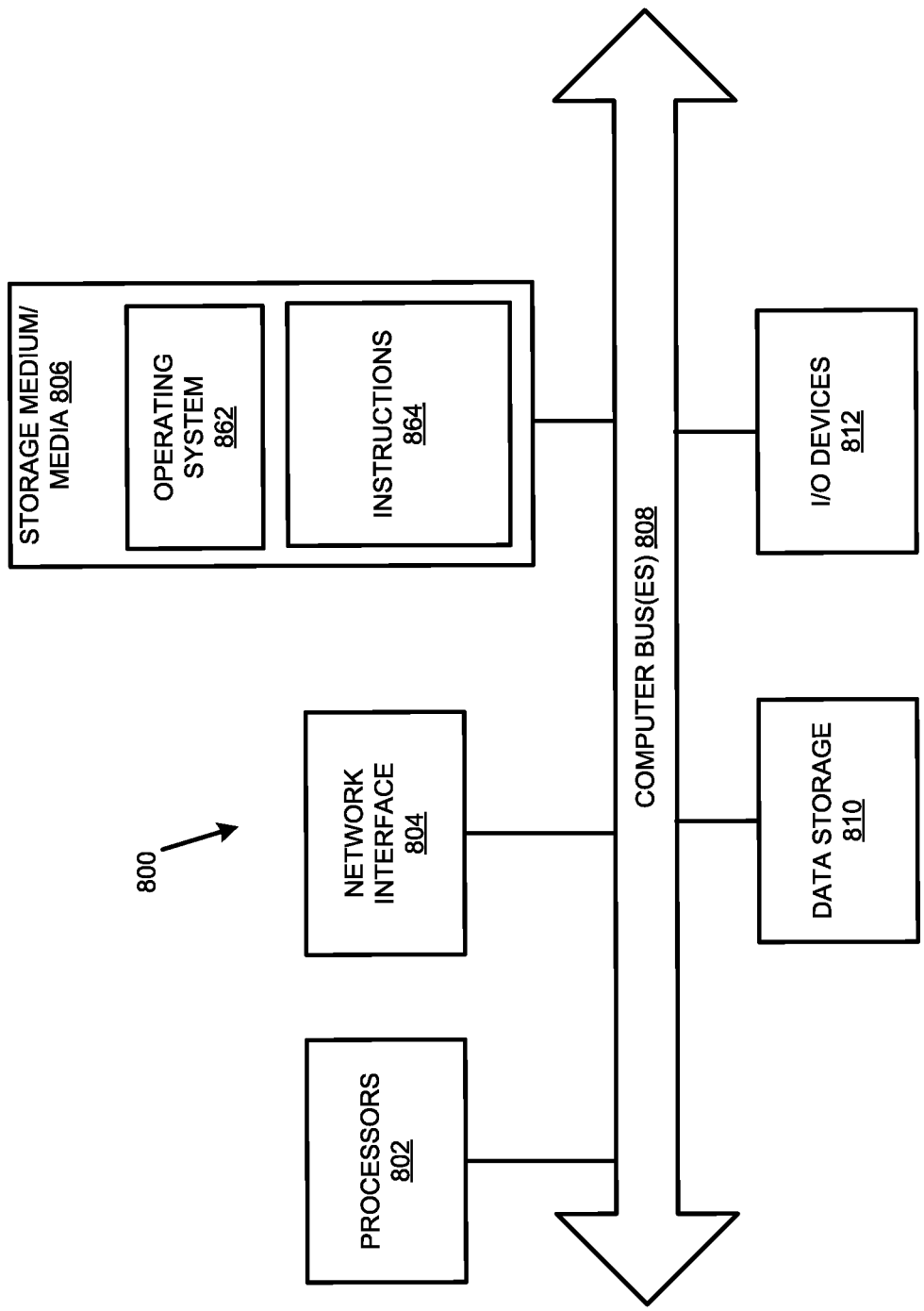
FIG. 8 illustrates a computer system that may be used to implement the AI-based automated process and the process monitoring system in accordance with the examples disclosed herein.

The information extracted from a received claim on the left hand side (LHS) 702 and the introspection data or metrics collected during the processing of the received claim on the right hand side (RHS) 704 in accordance with the examples disclosed herein. The extracted information is analyzed by different sub-processes 706, 708 and 710. The step outputs from each of the sub-processes 706, 708 and 710 are displayed on the RHS 704 of the UI 700. In addition, a summary 712 that corresponds to the final output 156 is also displayed which suggests a solution regarding the claim. In the instance shown on the UI 700, the summary 712 suggests paying the claim and the step outputs of the sub-processes 706, 708 and 710 explain why the health claim advisor is suggesting paying the claim. Disagree 716 and agree 714 buttons are provided to enable the user to validate the final output. In an example, the user valdiation can be further used to train the AI elements used in processing the received claim. If the user disagrees with the summary 712, the health claim advisor or the system executing the AI-based automated process 150 can seek further feedback from the user regarding which if any of the outputs from the processes 706, 708 and 710 cause the user to disagree. Thereby the user can not only make a more informed decision but also provide a more precise feedback as opposed to the feedback the user would have provided without the outputs from the processes 706, 708 and 710. The accuracy of the AI-based automated process 150 can therefore be increased FIG. 8 illustrates a computer system 800 that may be used to implement the AI-based automated process 150 and the process monitoring system 100. More particularly, computing machines such as desktops, laptops, smartphones, tablets and wearables which may be used to generate or access the data from the process monitoring system 100 may have the structure of the computer system 800. The computer system 800 may include additional components not shown and that some of the process components described may be removed and/or modified. In another example, a computer system 800 can sit on external-cloud platforms such as, Amazon Web Services, AZURE cloud or internal corporate cloud computing clusters, or organizational computing resources, etc.

The computer system 800 includes processor(s) 802, such as a central processing unit, ASIC or other type of processing circuit, input/output devices 812, such as a display, mouse keyboard, etc., a network interface 804, such as a Local Area Network (LAN), a wireless 802.11x LAN, a 3G or 4G mobile WAN or a WiMax WAN, and a computer-readable medium 806. Each of these components may be operatively coupled to a bus 808. The computer-readable medium 806 may be any suitable medium which participates in providing instructions to the processor(s) 802 for execution. For example, the computer-readable medium 806 may be non-transitory or non-volatile medium, such as a magnetic disk or solid-state non-volatile memory or volatile medium such as RAM. The instructions or modules stored on the computer-readable medium 806 may include machine-readable instructions 864 executed by the processor(s) 802 to perform the methods and functions of the process monitoring system 100.

The process monitoring system 100 may be implemented as software stored on a non-transitory computer-readable medium and executed by the one or more processors 802. For example, the computer-readable medium 806 may store an operating system 862, such as MAC OS, MS WINDOWS, UNIX, or LINUX, and code 864 for the process monitoring system 100. The operating system 862 may be multi-user, multiprocessing, multitasking, multithreading, real-time and the like. For example, during runtime, the operating system 862 is running and the code for the process monitoring system 100 is executed by the processor(s) 802.

The computer system 800 may include a data storage 810, which may include non-volatile data storage. The data storage 810 stores any data used by the process monitoring system 100. The data storage 810 may be used to store the received claim information, the various metrics to be collected, the values of the metrics collected and the like.

The network interface 804 connects the computer system 800 to internal systems for example, via a LAN. Also, the network interface 804 may connect the computer system 800 to the Internet. For example, the computer system 800 may connect to web browsers and other external applications and systems via the network interface 804.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An artificial intelligence (AI)-based automated process monitoring system comprising:
at least one processor; and
a non-transitory processor readable medium storing machine-readable instructions that cause the at least one processor to:
access code associated with an AI-based automated process that includes one or more sub-processes, wherein each sub-process of the one or more sub-processes implements at least one process component, wherein the AI-based automated process produces a detectable output, and wherein output of each sub-process of the one or more sub-processes is passed on to a next sub-process of the one or more sub-processes by corresponding process components of the at least one process component implemented by the sub-process of the one or more sub-processes;
automatically identify the at least one process component via a component identification tool;
retrieve one or more metrics associated with the at least one process component, wherein the one or more metrics correspond to respective attributes of the at least one process component during an implementation of the AI-based automated process;
parse the code associated with the AI-based automated process;
collect values of the one or more metrics via parsing the code associated with the AI-based automated process upon an execution of a respective sub-process of the one or more sub-processes included in the AI-based automated process; and
generate an introspection output for the AI-based automated process, wherein the introspection output includes a respective step output for each sub-process of the one or more sub-processes, wherein the respective step output includes the values of the one or more metrics, and wherein at least one of the values of the one or more metrics includes an action justification for the respective step output produced by the sub-process of the one or more sub-processes.

2. The AI-based automated process monitoring system of claim 1, wherein the at least one process component includes a plurality of process components, and wherein each process component of the plurality of process components is associated with a respective set of metrics.

3. The AI-based automated process monitoring system of claim 2, wherein the machine-readable instructions to retrieve the one or more metrics cause the at least one processor to:
select one of the respective set of metrics associated with the at least one process component.

4. The AI-based automated process monitoring system of claim 1, wherein the component identification tool includes a component-specific wrapper Application Programming Interface (API).

5. The AI-based automated process monitoring system of claim 1, wherein the machine-readable instructions to collect the values of the one or more metrics cause the at least one processor to:
execute code that includes access functions that collect the values of the one or more metrics, wherein the access functions are based on the at least one process component.

6. The AI-based automated process monitoring system of claim 1, wherein the machine-readable instructions to collect the values of the one or more metrics cause the at least one processor to:
monitor one or more rule events fired by one or more process rules during an execution of the AI-based automated process; and
collect the values of the one or more metrics based on the one or more rule events.

7. The AI-based automated process monitoring system of claim 1, wherein the machine-readable instructions to collect the values of the one or more metrics cause the at least one processor to:
receive output values from explicitly configured functions in the code associated with the AI-based automated process, wherein the output values correspond to the values of the one or more metrics.

8. The AI-based automated process monitoring system of claim 1, wherein the machine-readable instructions to generate the introspection output cause the at least one processor to:
enable display of code that generates the introspection output.

9. The AI-based automated process monitoring system of claim 1, wherein the machine-readable instructions to generate the introspection output cause the at least one processor to:
access a predetermined template that includes natural language content conveying the values of the one or more metrics.

10. The AI-based automated process monitoring system of claim 1, wherein the non-transitory processor readable medium stores further machine-readable instructions that cause the at least one processor to:
compare the values of the one or more metrics to predetermined thresholds; and
generate alerts based on the comparisons of the values of the one or more metrics.

11. A method of monitoring an artificial intelligence (AI)-based automated process comprising:
receiving process monitoring instructions for the AI-based automated process, wherein the AI-based automated process includes one or more sub-processes, wherein each sub-process of the one or more sub-processes implements one or more process components, wherein the AI-based automated process produces a detectable output, and wherein output of each sub-process of the one or more sub-processes is passed on to a next sub-process of the one or more sub-processes by corresponding process components of the one or more process components implemented by the sub-process of the one or more sub-processes;
automatically identifying the one or more process components by employing respective component identification tools;
selecting one or more sets of metrics associated with the one or more process components, wherein each set of metrics of the one or more sets of metrics corresponds to attributes of a respective process component of the one or more process components during an implementation of the AI-based automated process;
collecting values associated with each set of metrics of the one or more sets of metrics during an execution of a respective sub-process of the one or more sub-processes included in the AI-based automated process; and
generating an introspection output for the AI-based automated process, wherein the introspection output includes a respective step output for each sub-process of the one or more sub-processes, wherein the respective step output includes the values associated with each set of metrics of the one or more sets of metrics, and wherein at least one of the values associated with each set of metrics of the one or more sets of metrics includes an action justification for the respective step output produced by the sub-process of the one or more sub-processes.

12. The method of claim 11, wherein generating the introspection output further comprises:
generating, within the introspection output, a summary which provides a final output based on the respective step output for each sub-process of the one or more sub-processes.

13. The method of claim 11, wherein receiving the process monitoring instructions further comprises:
downloading a library that includes at least the respective component identification tools.

14. The method of claim 13, wherein downloading the library farther comprises:
including wrapper application programming interfaces (APIs) specific to a respective process component of the one or more process components as the respective component identification tools.

15. The method of claim 11, wherein the AI-based automated process includes conversion of a textual manual into an executable set of instructions.

16. The method of claim 15, wherein the one or more sub-processes include structural analysis of a textual manual, semantic analysis of textual content in the textual manual, obtaining domain specific knowledge, retrieving logic, generating process flow based on the logic and the domain specific knowledge, and platform-specific code generation.

17. A non-transitory computer-readable storage medium storing machine-readable instructions that cause a processor to:
- access code associated with an artificial intelligence (AI)-based automated process that includes one or more sub-processes, wherein each sub-process of the one or more sub-processes implements at least one process component, wherein the AI-based automated process produces a detectable output, and wherein output of each sub-process of the one or more sub-processes is passed on to a next sub-process of the one or more sub-processes by corresponding process components of the at least one process component implemented by the sub-process of the one or more sub-processes;
- automatically identify the at least one process component via a component identification tool;
- retrieve one or more metrics associated with the at least one process component, wherein the one or more metrics correspond to respective attributes of the at least one process component during an implementation of the AI-based automated process;
- parse the code associated with the AI-based automated process;
- collect values of the one or more metrics via parsing the code associated with the AI-based automated process upon an execution of a respective sub-process of the one or more sub-processes included in the AI-based automated process; and
- generate an introspection output for the AI-based automated process, wherein the introspection output includes a respective step output for each sub-process of the one or more sub-processes, wherein the respective step output includes the values of the one or more metrics, and wherein at least one of the values of the one or more metrics includes an action justification for the respective step output produced by the sub-process of the one or more sub-processes.

18. The non-transitory computer-readable storage medium of claim 17, wherein the machine-readable instructions for generating the introspection output further comprising machine-readable instructions that cause the processor to:
- generate, within the introspection output, a summary which provides a final output based on the respective step output for each sub-process of the one or more sub-processes.

19. The non-transitory computer-readable storage medium of claim 17, further storing machine-readable instructions that cause the processor to:
- download process monitoring instructions in a library that includes at least the component identification tool.

20. The non-transitory computer-readable storage medium of claim 19, wherein the machine-readable instructions for accessing the code associated with the AI-based automated process further comprising machine-readable instructions that cause the processor to:
- include wrapper application programming interfaces (APIs) specific to a respective process component of the at least one process component as the component identification tool.

* * * * *